(12) United States Patent
Ewbank

(10) Patent No.: X3697
(45) Date of Patent: May 9, 1823

(54) PIPES, COATING WITH TIN

(76) Inventor: Thomas Ewbank

Thomas Ewbank
Letters Patent

The Schedule referred to in these Letters Patent, and making part of the same, containing a description in the words of the said Thomas Ewbank himself, of his improvement in the manufacture of tin plated lead pipe for still worms and other purposes

---

Having run any requisite quantity of Lead into a flat rectangular, mould, of convenient size, the moment the lead is set it becomes solid:— block or grain tin (in proportion to the thickness of the required plating) is immediately run upon the surface of the lead, which instantly unites with it, and becomes one solid, mass; when it is passed through rollers till brought as thin as required, after which it is cut into proper sizes, and made into pipe in the usual way.

Witnesses — Thomas Ewbank

Isaac Adriance

C. M. Bridges 138 words

[illegible]

2—328 a.

DRAFTSMAN'S DIVISION.

*All communications should be addressed to "The Commissioner of Patents. Washington. D. C."*

*DEPARTMENT OF THE INTERIOR,*

United States Patent Office,

*Washington, D. C., ......, 189...*

*SIR:*

*The printed* copies *of Patent No.* ? Eubank are *exhausted.* May 9. 1823

*As soon as printed a copy will be mailed you to complete your order.*

*By direction of the Commissioner:*

*Very respectfully,*

*Chief Clerk.*

814306-97-5m